(No Model.)
D. O. BECKWITH.
CAR FENDER.
No. 573,638. Patented Dec. 22, 1896.
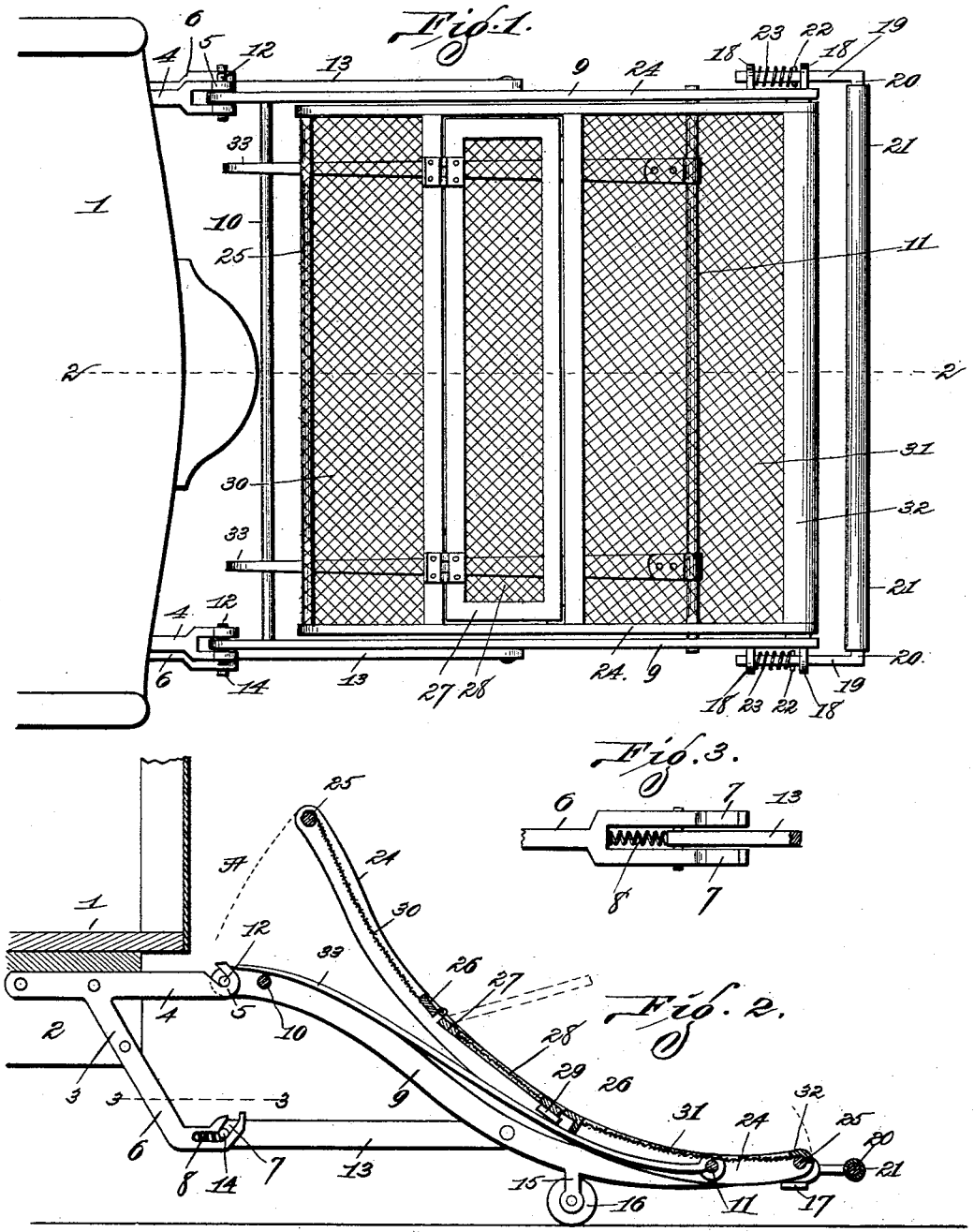
Attest
M. R. Smith,
Albert J. McCauley
Inventor:—
David O. Beckwith.
By Higdon & Higdon & Longan
Attys.

UNITED STATES PATENT OFFICE.

DAVID O. BECKWITH, OF ST. LOUIS, MISSOURI, ASSIGNOR OF ONE-HALF TO WILLIAM S. WALKER, JR., OF SAME PLACE.

CAR-FENDER.

SPECIFICATION forming part of Letters Patent No. 573,638, dated December 22, 1896.

Application filed April 16, 1896. Serial No. 587,749. (No model.)

*To all whom it may concern:*

Be it known that I, DAVID O. BECKWITH, of the city of St. Louis, State of Missouri, have invented certain new and useful Improvements in Car-Fenders, of which the following is a full, clear, and exact description, reference being had to the accompanying drawings, forming a part hereof.

My invention relates to an improved car-fender; and it consists in the novel construction, combination, and arrangement of parts hereinafter described and claimed.

In the drawings, Figure 1 is a top plan view of my improved car-fender. Fig. 2 is a longitudinal sectional view taken approximately on the indicated line 2 2 of Fig. 1. Fig. 3 is a horizontal sectional view taken approximately on the indicated line 3 3 of Fig. 2.

Referring by numerals to the accompanying drawings, 1 indicates the car-platform, and 2 the transom-timbers of the car, to the inside faces of which transom-timbers are bolted forked brackets 3, the upper arms 4 of which extend in a horizontal line forward a slight distance from the dashboard of the car, the forward ends of said arms 4 being bifurcated and provided with the hooks 5. The lower arms 6 of said brackets extend downwardly from the transom-timbers, the lower ends of said arms 6 occupying positions immediately beneath the forward ends of the arms 4, and said forward ends are bifurcated and provided with the slots 7. Located and held within the bifurcated ends of the arms 6 are expansive coil-springs 8, the function of which will be presently shown.

The frame of my improved fender comprises a pair of compound-curved side bars 9, framed together by the transversely-arranged bars 10 and 11, the bar 10 being arranged near the rear ends of the bars 9 and the bar 11 near the forward end. The rear upper ends of the side bars 9 occupy the bifurcated forward ends of the arms 4, and said rear ends are provided with transversely-arranged pins 12, that engage in the hooks 5. Pivoted to the outside faces of the side bars 9 at points intermediate their ends are the forward ends of bars 13, the rear ends of which occupy the bifurcated forward ends of the arms 6, and said rear ends are provided with transversely-arranged pins 14, which operate in the slots 7. When the bars 13 are correctly positioned, their rear ends engage directly against the coil-springs 8.

Formed integral with and depending from the side bars 9 are short arms 15, to the lower ends of which are journaled in any suitable manner small traction-wheels 16, that are intended to ride directly upon the track-rails. To the extreme forward ends of the side bars 9 are formed integral inwardly-projecting lugs or stops 17.

Formed on or fixed to the outside faces of the forward ends of the bars 9 are the pairs of horizontally-alined perforated ears 18, through which move the rearwardly-bent ends 19 of a bar 20, that extends transversely across the front of the entire fender. Said bar 20 is covered with a body of rubber or analogous material, (indicated by the numeral 21.) Passing through the rearwardly-bent ends 19 at points between the perforated ears 18 are pins 22, there being expansive coil-springs 23 located upon the ends 19 between these pins 22 and the rear ears of each pair.

The rocking frame of my improved fender comprises the segmentally-bent side bars 24, the same being framed together at their ends by the transversely-arranged rods 25. The side bars 24 are pivotally swung upon the transversely-arranged rod 11, and extending transversely between said side bars 24 at points intermediate their ends are transverse bars 26, to the top one of which is hinged a rectangular frame 27, the forward end of which lies adjacent the lower one of said bars 26, said frame 27 being covered with suitable wire-netting 28.

Lugs 29 are formed integral with the inner faces of the side bars 24 adjacent the ends of the lower one of the bars 26, the forward end of the hinged frame 27 normally resting upon said lugs 29. Extending from the top one of the transverse bars 26 to the top rod 25 is a section of wire-netting 30, and there is also a section of wire-netting 31 extending from the lower one of the transverse bars 26 to the rod 25, that extends transversely between the forward ends of the bars 24. Lying immediately above the forward rod 25 is a transversely-extending bar 32. Leaf-springs 33 have their forward ends looped around the transverse rod 11, said leaf-springs extending from thence upwardly and rearwardly and their rear ends being engaged over the transversely-arranged rod 10. The forward end of the lower one of the transverse bars 26 normally rests upon these leaf-springs 33, and by so doing retains the rear end of the rocking frame of the fender in an elevated position.

In the practical use of my improved fender, after the various parts are assembled as shown in the drawings and herein described, the same is located upon the front of the car by engaging the pins 12 in the hooks 5 and the pins 14 in the slots 7. By forming said slots 7 the forward end of the fender is allowed to swing upwardly and downwardly to conform with any irregularity in the track, and when said forward end swings upwardly and downwardly the rear ends of the bars 13 move a slight distance horizontally in the bifurcated lower ends of the arms 6. The coil-springs 8 always tend to throw the bars 13 forwardly, which necessarily raises the forward end of the entire fender.

The force of the blow of the fender on coming in contact with an obstruction on the track will be broken by positioning the horizontally-moving bar 20 in front of the fender, said bar moving rearwardly and overcoming the slight resistance offered by the coil-springs 23 whenever said bar comes in contact with an obstructing body. The body on being struck by the fender will necessarily fall onto the rocking frame covered with the various sections of wire-net, and as said body falls and is caught the rear end of said rocking frame will swing downwardly, as indicated by the dotted lines A, Fig. 2, during which downward movement resistance offered by the leaf-springs 33 will be overcome, and said frame will be swung downwardly into such position as that it may readily hold and retain the body until the car is stopped. It will thus be seen that through the medium of the springs 23 and 33 the force of the blow of the fender on coming in contact with an obstructing body and the fall of said body on said fender is greatly broken, and no serious results will ensue by the picking up of a body by a fender so constructed. By raising the hinged frame 27 to a position as shown by dotted lines in Fig. 2 two cars may be coupled together even while the fender is attached to one of said cars.

Such a fender is simple, strong, and durable, may be readily changed from one end of the car to the other, is entirely automatic in operation, and not being dependent upon the attention of the driver is always ready for operation, will not easily get out of order, and is very efficient in use.

I claim—

1. In combination with a car, the forked brackets 3, the side bars 9 connected to the upper forks of said brackets, the bars 10 and 11 framing said side bars together, the bars 13 pivoted to said side bars and connected to the lower forks of said brackets, the coil-springs 8 at the rear ends of said bars 13, traction-wheels under the forward ends of said side bars, the ears 18 upon the forward ends of said side bars, the bar 20 having the rearwardly-bent ends 19 operating in said ears, the coil-springs 23 upon said ends 19 and between said ears, the side bars 24 pivotally swung upon the rod 11, the rods 25 connecting said side bars, the leaf-springs 33 attached to said rod 11, substantially as specified.

2. In a car-fender, the side bars 9, suitable means of supporting said side bars, the bars 10 and 11 framing said side bars together, the side bars 24 pivotally swung upon the bar 11, the rods 25 connecting said side bars 24, the leaf-springs 33 attached to said bar 11 and underneath said rods 25, the free ends of said leaf-springs 33 resting upon the bar 10, the transverse bars 26 connecting said side bars 24 at points intermediate their ends, the rectangular frame 27 hinged to the upper one of said transverse bars 26 and wire-netting upon the frames thus formed, substantially as specified.

In testimony whereof I affix my signature in presence of two witnesses.

DAVID O. BECKWITH.

Witnesses:
M. P. SMITH,
S. G. WELLS.